Figure 1:
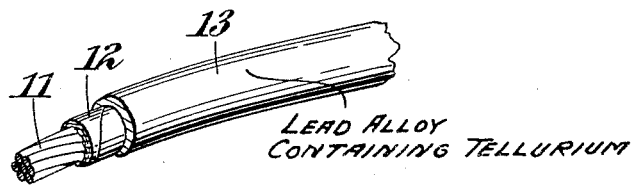

Nov. 10, 1936.   W. SINGLETON ET AL   2,060,533
MANUFACTURE OF LEADEN ARTICLES
Filed Nov. 22, 1933

Patented Nov. 10, 1936

2,060,533

UNITED STATES PATENT OFFICE 2,060,533

MANUFACTURE OF LEADEN ARTICLES

William Singleton, Wembley, William Hulme, Bush Hill Park, and Brinley Jones, Blackheath, London, England, assignors to Goodlass Wall and Lead Industries Limited, London, England, a British company Application November 22, 1933, Serial No. 699,282
In Great Britain December 8, 1932

8 Claims. (Cl. 136—65)

This invention comprises improvements in or relating to the manufacture of leaden articles and while the invention is particularly applicable to the manufacture of certain cast or extruded articles such as battery plates and extruded covering over electric cables certain features of the invention are of broader application.

The invention depends upon the discovery that lead and certain alloys of lead with antimony, tin or cadmium or more than one of these metals are stronger and more resistant to corrosion than lead or such alloys not containing tellurium. Thus, for example, the addition of extremely small proportions of tellurium such as 0.04% to 0.07% to pure lead serve to raise the resistance of the lead to hot sulphuric acid to a very high degree and in proportions exceeding 0.07% the lead becomes resistant even to boiling sulphuric acid.

Again, the presence in metallic lead of a proportion of tellurium lying within the limits of 0.02% and 0.1%, while leaving the metal sufficiently ductile for cold working yet renders it susceptible to permanent toughening by means of cold work. In other words the material becomes susceptible to permanent work hardening, a property not possessed by pure lead. The tensile strength of cold worked lead, i. e. lead sheet, is more than doubled while hot extruded products such as pipes though initially soft develop strength when subjected to strain by reason of the work hardening property of the material and become much more resistant to pressure and yield more evenly under the effects of strain. For example, extruded pipes made of lead containing tellurium in this manner become more capable of resisting repeated freezings of water contained within them without rupture than are pipes of ordinary lead or lead alloys.

At elevated temperatures the material may be annealed but at normal atmospheric temperatures the work hardened condition is retained.

As applied to alloys of the kinds above mentioned, that is to alloys containing antimony, tin or cadmium, the ordinary desirable properties of these alloys are retained with a more extensive range of extrusion temperatures and further the alloys become susceptible to work hardening.

One important feature of the present invention comprises a process for the manufacture of insulated electric conductors characterized by sheathing the conductor (for example by extrusion) with an alloy of lead containing a small proportion of tellurium (for example from 0.02% to 0.1% of tellurium). The alloy may also contain other metals such as antimony, cadmium and tin.

The present invention includes electric insulated conductors produced by the process above described.

In applying the present invention to the extrusion of coatings upon electric conductors or other extrusion operations the ordinary extrusion apparatus used for extruding lead may be employed.

The lead tellurium sheathing of the electric cable is particularly resistant to fatigue effects due to vibration and other causes and has a smoother finish and is more resistant to corrosion than ordinary lead sheathings. The addition of tellurium to lead enables it to develop strength when strained due to its work hardening properties. As extruded hot the metallic sheathing is in the soft condition and develops strength when stressed in any way so that it builds up resistance to distortion.

Figure 2:
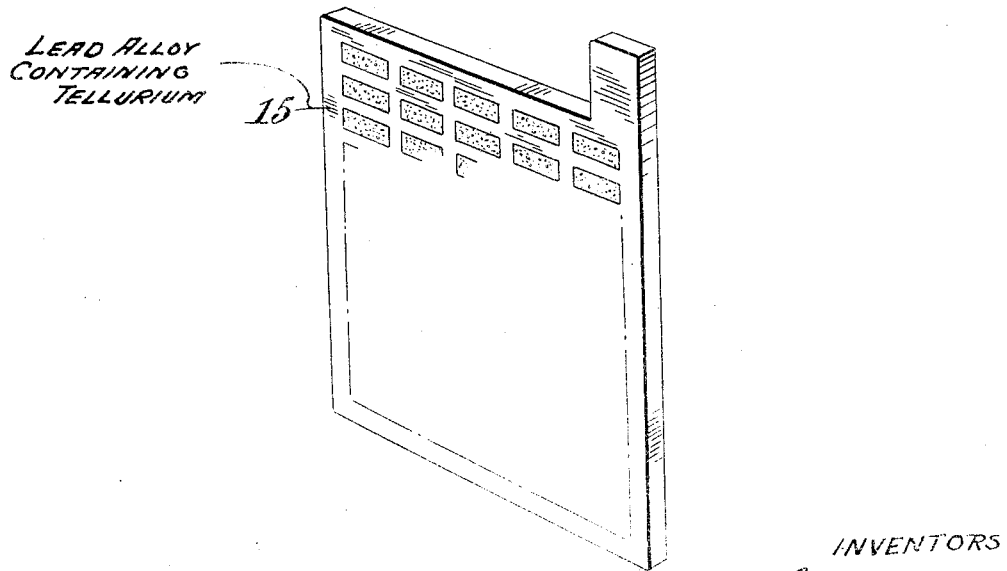

In the accompanying drawing Figure 1 shows an electric conductor and Figure 2 shows a cast battery plate.

The accompanying drawing, Figure 1, shows by way of example an electric conductor 11 which carries insulating material 12 and is sheathed with a lead alloy coating 13. The coating 13 consists of lead alloyed with tellurium in a proportion of 0.05%.

Again, according to a further feature of the invention an electrode for a lead storage battery comprises a lead alloy having as an essential constitutent the metal tellurium. While the proportion of tellurium within the scope of this invention may be any desired, the invention contemplates particularly the addition of small percentages even down to additions of the order of less than 0.1% of tellurium. Even in these minute proportions the addition of tellurium favourably affects the resistance to corrosion of the alloys under the conditions obtaining in storage batteries. In addition considerable advantages lie in the improved mechanical strength of the metal and its resistance to fatigue.

Additions of tellurium up to 0.07% or thereabouts appear to remain in the resulting lead-tellurium alloy uniformly dispersed in the crystals of the metal and cannot be detected by microscopic observation. Larger proportions, for example .25% show signs of a distinct telluride which can be microscopically observed and which tends to segregate and therefore produce planes of weakness or brittleness.

Lead and tellurium alone may be employed and the strength is increased as compared with the strength of pure lead, or where other strengthening ingredients, such as antimony, are desired these may be present in smaller quantities than are usually employed.

Where cast battery plates are produced according to this invention it may sometimes be desirable to include a proportion of antimony in the alloy but the quantity employed will for equal strength, be less than where the tellurium constituent is absent. A similar condition holds in the case of battery plates made from rolled sheet and in this case the tough character of the sheet, by reason of its having been cold-worked, gives initial strength so that the quantity of antimony, if any, to be added is materially reduced.

The accompanying drawing, Figure 2, shows by way of example a cast battery plate 15 of suitable form for employment of an alloy according to the present invention. The battery plate consists of an alloy of lead 93.95%, antimony 6% and tellurium 0.05%.

We claim:—

1. An electrode for a lead storage battery comprising a lead alloy consisting preponderatingly of lead and the balance consisting of tellurium in a proportion not exceeding 0.25% of tellurium.

2. An electrode for a lead storage battery comprising a lead alloy consisting preponderatingly of lead and the balance consisting of tellurium in a proportion not exceeding 0.25% and antimony in a proportion not exceeding 16%.

3. An electrode for a lead storage battery comprising a lead alloy consisting preponderatingly of lead and the balance consisting of tellurium in a proportion not exceeding 0.25% and antimony in a proportion not exceeding 8%.

4. An electrode for a lead storage battery comprising a lead alloy consisting preponderatingly of lead and the balance consisting of tellurium in a proportion not exceeding 0.25% and antimony in a proportion not exceeding 6%.

5. An electrode for a lead storage battery comprising a lead alloy consisting preponderatingly of lead and the balance consisting of tellurium in a proportion not exceeding 0.1% and antimony in a proportion approximately of the order of 6%.

6. An electrode for a lead storage battery comprising a grid or equivalent for the support of the active material, which grid consists of a lead alloy having as an essential constituent the element tellurium, in a proportion not exceeding 0.25% of tellurium.

7. An electrode for a lead storage battery as claimed in claim 6, wherein the alloy comprises also antimony or other strengthening constituent.

8. An electrode for a lead storage battery comprising a lead alloy consisting preponderatingly of lead and the balance consisting of tellurium in a proportion approximately of the order of 0.05% and antimony in a proportion approximately of the order of 6%.

WILLIAM SINGLETON.
WILLIAM HULME.
BRINLEY JONES.